United States Patent [19]
Inoue

[11] Patent Number: 4,527,729
[45] Date of Patent: Jul. 9, 1985

[54] DIE FORMING METHOD
[75] Inventor: Kiyoshi Inoue, Tokyo, Japan
[73] Assignee: Inoue-Japax Research Inc., Yokohama, Japan
[21] Appl. No.: 438,810
[22] Filed: Nov. 3, 1982
[30] Foreign Application Priority Data
  Nov. 7, 1981 [JP] Japan .................. 56-178655
[51] Int. Cl.³ .............................................. B23P 1/00
[52] U.S. Cl. .................... 228/162; 219/69 M; 228/174
[58] Field of Search .............................. 228/160–162, 228/170, 174, 184; 219/69 M

[56] References Cited
U.S. PATENT DOCUMENTS
1,898,883  2/1933  Matheson ............................ 228/160
3,258,840  7/1966  Hedgewick et al. ................ 228/162
3,694,610  9/1972  Saito et al. ........................ 219/69 M
4,409,457  10/1983 Takahashi et al. ................ 219/69 M FOREIGN PATENT DOCUMENTS
971020   9/1964  United Kingdom .
1234005  6/1971  United Kingdom .
1290246  9/1972  United Kingdom .

Primary Examiner—Kenneth J. Ramsey
Attorney, Agent, or Firm—Karl F. Ross; Herbert Dubno

[57] ABSTRACT

A novel and highly efficient die forming method is disclosed wherein a plurality of blank workpieces, preferably plate blanks, are prepared and assembled together in a format such that a die blank may be produced therefrom which has a contour at least roughly approaching the contour of a desired die product. The blank workpieces are assembled together by permanently joining them, preferably by fusion-welding. The die blank so produced is then preferably subjected to heat-treatment and is thereupon machined, preferably by EDM, to progressively develop the desired contour therein from the rough-shaped contour.

3 Claims, 6 Drawing Figures

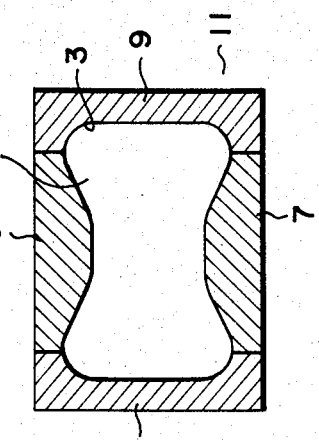 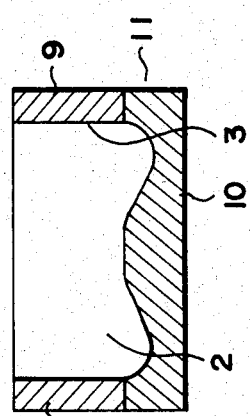
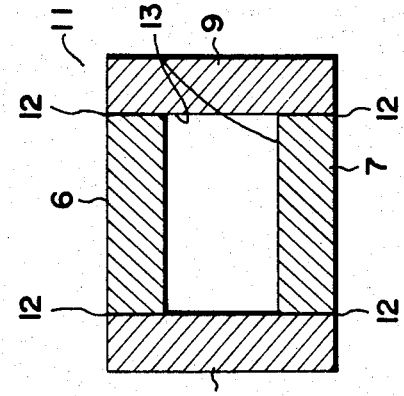 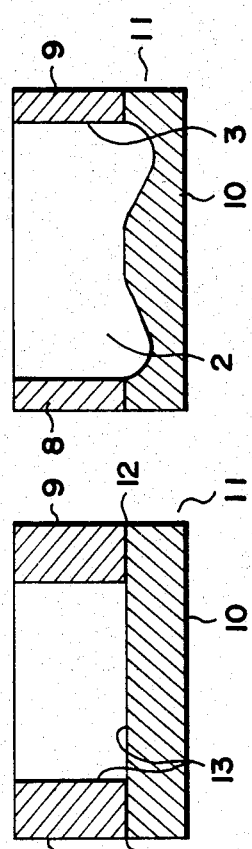
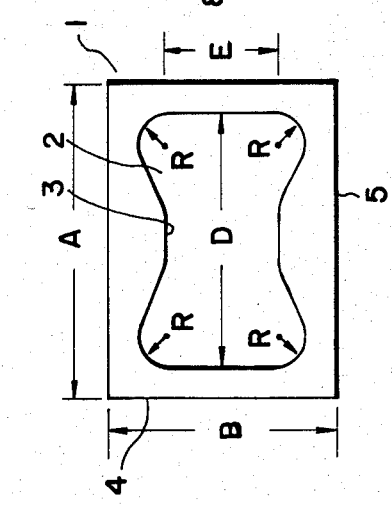 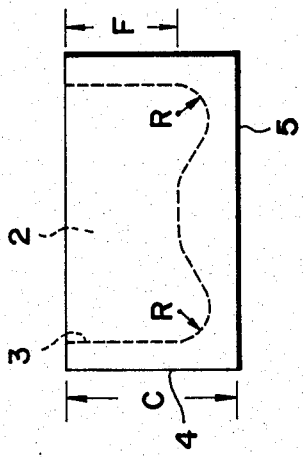
FIG. 3A  FIG. 3B
FIG. 2A  FIG. 2B
FIG. 1A  FIG. 1B

DIE FORMING METHOD

FIELD OF THE INVENTION

The present invention relates to die forming method and, more particularly, to a novel method of forming a die product, e.g. a powder-metallurgy die, a punching die, a glass-molding die or a plastic-extrusion die.

BACKGROUND OF THE INVENTION

In forming a die as such, it has in the past been the common practice to machine or remove stock from a die blank or single block workpiece to impart thereto a desired die contour, which must commonly be of high accuracy. The die blank is commonly composed of a special material, metal or alloy, which is generally expensive, and hard or not readily machinable. Thus, in gaining the desired die contour, a substantial volume of valuable stock has had to be consumed or has become useless, and moreover by expending a large amount of energy and a considerable amount of time.

OBJECTS OF THE INVENTION

The present invention seeks to provide a new die forming method which allows a desired die contour to be obtained much more efficiently than with the conventional process and which can save energy, time and material. The invention also seeks to provide a die forming method as described which is highly adaptable to CAD (computer-aided design) and CAM (computer-aided manufacturing) of dies.

SUMMARY OF THE INVENTION

In accordance with the present invention there is provided a method of forming a die product of a desired die contour, which method comprises the steps of: (a) selecting a plurality of blank workpieces such that, and planning to arrange them in a format such that, a die blank may be assembled therefrom which has a contour that at least roughly approaches the desired die contour; (b) permanently joining the selected blank workpieces together as in the planned format of arrangement to produce the die blank of rough-shaped contour; and thereafter (c) machining the die blank to progressively develop the desired contour therein from the rough-shaped contour.

BRIEF DESCRIPTION OF THE DRAWINGS

The present invention will hereinafter be described by way of example with reference to the accompanying drawing in which:

FIGS. 1(a) and 1(b) are top-plan and side-sectional views, respectively, diagrammatically illustrating a certain desired die product as shown in the plan;

FIGS. 2(a) and 2(b) are similar views, respectively, diagrammatically illustrating a die blank assembled from a plurality of blank workpieces according to the principles of the present invention; and FIGS. 3(a) and 3(b) are similar views, respectively, diagrammatically illustrating a die product obtained by machining the die blank in FIG. 2 according to the principles of the present invention.

SPECIFIC DESCRIPTION

In FIGS. 1(a) and 1(b), an exemplary die product 1 as may be desired is illustrated as shown in a plan. It is seen that the die product 1 should have a shaped cavity 2 to be formed therein with a desired die contour 3. The desired die product 1 is shown as having four rectangular outer side walls 4 and one rectangular bottom 5, which abut one another at right angles to define the limbs of a frame structure. A three-dimensioned rectangular outer surface constituted by these walls is shown as being characterized by lengths A, B and C. The die cavity 2 has three characteristic lengths D, E and F which are parallel to lengths A, B and C, respectively, where $D<A$, $E<B$ and $F<C$ and a plurality of curved corners of a radius of curvature R.

In obtaining the die product 1, it has been the conventional practice to prepare a simple rectangular block characterized by lengths A, B and C and then to machine it, say, by EDM (electrical discharge machining), so as to form the cavity 2 therein so that an entire volume of stock defined by the contour 3 is removed from the prepared block. Thus, this entire volume had to be removed from the prepared block or worn or has had to become useless, and energy and time have had to be expended in order to to remove the same.

In obtaining the same die product 1, the present invention may be embodied by preparing five rectangular plate workpieces 6–10 and assembled together in a format of arrangement as shown in FIGS. 2(a) and 2(b) to produce a die blank 11. It will be apparent that plates 6 and 7 may have a thickness which is equal to or slightly in excess of $(B-E)/2$, a length equal to $(D-2R)$ and a width equal to F. Then, the plates 8 and 9 may have a thickness equal to $\{(A-D)/2+R\}$, a length equal to B and a width equal to F and the plate 10 may have a thickness equal to $(C-F)$, a length equal to A and a width equal to B. In assembling together the plates 6–10 so selected, they are permanently joined together. The plates 6–10 can be advantageously joined together permanently by fusion welding. The welded interfaces or zones are shown at 12 in FIGS. 2(a) and 2(b). The cavity enclosed by the frame structure is smaller than the cavity of the die to be machined therein.

It is then desirable to subject the welded plates 6–10 to heat treatment to remove thermal stresses therein, to effect hardening thereof and to metallurgically stabilize the welded zones 12. In this manner, a unique die blank 11 is produced which is in the form of a box open at its top as shown. It will be apparent that the die blank 11 has along its inner surface a contour 13 which roughly approaches the desired contour 3 of the die cavity 2 to be obtained. There is no loss of the die stock or material in providing the rectangular hollow or recess 14 defined by the rough contour 13, the hollow 14 constituting a substantial or major portion of the die cavity 2 to be obtained.

The hollow die blank 11 is then subjected to machining. The machining step can be carried out advantageously by EDM in one of various known modes. In one typical EDM mode, a tool electrode shaped to be complementary with the desired cavity 2 or contour 3 is positioned in spaced juxtaposition with the die blank 11 and coaxially with the hollow 14 in the presence of an EDM liquid medium such as a hydrocarbon or water. A succession of EDM pulses are applied between the tool electrode and the die blank 11 to electroerosively remove stock from the regions of the die blank 11 which are located closest to the juxtaposed tool electrode. As stock removal proceeds, the tool electrode and the die blank are relatively displaced to advance machining until the contour 13 in its entire profile reaches the desired contour 3. The desired cavity 2 with the high-precision contour 3 produced in this manner in the die blank 11 is shown in FIGS. 3(a) and 3(b). Note that material is removed by EDM from each of the frame members and weld junctions.

In this manner, it will be apparent that only a small volume of stock need to be removed in the machining stage so that considerable saving not only of die material but also of time and energy for machining is achieved. Furthermore, a die can be formed with greater precision than with the conventional method. Today, EDM is extensively exploited for forming a die because of its high-precision machining ability, although the EDM machining precision depends on the machining time. The longer the machining time, the less is the EDM machining precision. The present invention which allows the machining time to be largely reduced can thus take further advantages of EDM to increase the die forming precision.

In the method of this invention, special steels and materials which can be hardenable, carbonizable or nitridable by heat treatment can advantageously be used as die materials to yield formed dies which are pressure-resistant and wear-resistant.

In the method of this invention, it may also be noted that a portion of blank workpieces 6–10 which particularly requires wear-resistance can be constituted by a hard material to provide a purposefully formed die.

The blank workpieces for use in the method of this invention should also preferably all be plate blanks so that only plate blanks in a number of different size grades need be stored in a storehouse and a suitable set of such plate blanks can be selected from the storage and assembled together according to a particular die product desired. In this manner, a die of any desired shape and size can be produced.

It should further be noted that the present invention makes die forming more suitable for CAD/CAM to allow the manufacture of a die products on a fully automatic basis. Thus, a computer can be used to design a desired die having a particular shape and size required and to prepare a drawing thereof. The prepared drawing can be transferred to a plant where a computer is used to automatically determine from the drawing sizes of plates and their format of arrangement appropriate to the desired die and to allow such a set of plates determined to be automatically picked up from the storage and to allow them to be automatically assembled in the determined format of arrangement by successively welding one to another accordingly to produce a die blank. The produced die blank is then automatically transferred to a heat-treating station. The heat-treated die blank is then transferred automatically to an EDM machine where it is machined to acquire the desired die contour. In this manner, any desired die product can be manufactured efficiently and economically.

What is claimed is:

1. A method of forming a die product with a cavity of a desired die contour, the method comprising the steps of:
   (a) selecting a plurality of solid rectangular parallelepipedal blank workpieces such that, and planning to arrange them in a format such that, a die blank may be assembled therefrom having frame construction with limbs enclosing a cavity having a contour at least roughly approaching said desired die contour but smaller than said desired die contour;
   (b) permanently joining said selected blank workpieces so that said selected blank workpieces form said limbs in said planned format of arrangement at abutting joints of said limbs and firmly affixing them together at said joints to produce a die blank frame with said cavity of rough-shaped contour; and thereafter
   (c) machining said die blank to progressively develop said desired contour therein from said rough-shaped contour by removing material laterally from each of said blank workpieces.

2. The method defined in claim 1 wherein said blank workpieces are welded together at said joints and the removal of said material in step (c) is effected by electric discharge machining and includes removal of material from the welds at said joints.

3. The method defined in claim 2 wherein said frame is heat-treated prior to step (c).

* * * * *